(12) United States Patent
Hildebrand et al.

(10) Patent No.: US 7,716,175 B2
(45) Date of Patent: May 11, 2010

(54) METHODS, SYSTEMS, AND COMPUTER PROGRAM PRODUCTS FOR MULTICAST COMPRESSION AND PACING OF DATABASE UPDATE MESSAGES TRANSMITTED BETWEEN PROCESSING MODULES IN A DISTRIBUTED PROCESSING SYSTEM

(75) Inventors: John L. Hildebrand, Hillsborough, NC (US); Paul H. Hardin, Sr., Apex, NC (US)

(73) Assignee: Tekelec, Morrisville, NC (US)

( * ) Notice: Subject to any disclaimer, the term of this patent is extended or adjusted under 35 U.S.C. 154(b) by 1095 days.

(21) Appl. No.: 10/915,782

(22) Filed: Aug. 11, 2004

(65) Prior Publication Data

US 2006/0036606 A1    Feb. 16, 2006

(51) Int. Cl.
*G06F 17/30* (2006.01)
(52) U.S. Cl. .................................. 707/607; 707/999.001
(58) Field of Classification Search ....................... None
See application file for complete search history.

(56) References Cited

U.S. PATENT DOCUMENTS

| | | | | |
|---|---|---|---|---|
| 6,201,792 | B1 * | 3/2001 | Lahat | 370/236 |
| 6,336,143 | B1 | 1/2002 | Diedrich et al. | |
| 6,728,211 | B1 * | 4/2004 | Peris et al. | 370/235 |
| 7,079,501 | B2 * | 7/2006 | Boivie | 370/312 |
| 7,609,693 | B2 * | 10/2009 | Anderson et al. | 370/390 |
| 2002/0091846 | A1 * | 7/2002 | Garcia-Luna-Aceves et al. | 709/230 |
| 2004/0081206 | A1 * | 4/2004 | Allison et al. | 370/522 |

* cited by examiner

*Primary Examiner*—John E Breene
*Assistant Examiner*—Thu-Nguyet Le
(74) *Attorney, Agent, or Firm*—Jenkins, Wilson, Taylor & Hunt, P.A.

(57) ABSTRACT

Methods, systems, and computer program products for multicast compression and pacing are disclosed. In one method, messages relating to events that affect or require use of a database maintained by multiple processing modules in a distributed processing system are received. The messages are buffered and placed in a third message in a manner that preserves time ordering of the messages. The packed message is then multicast to the processing modules. Each processing module processes messages that are addressed to it. A method for pacing multicast messages destined for the processing modules is also provided.

22 Claims, 9 Drawing Sheets

METHODS, SYSTEMS, AND COMPUTER PROGRAM PRODUCTS FOR MULTICAST COMPRESSION AND PACING OF DATABASE UPDATE MESSAGES TRANSMITTED BETWEEN PROCESSING MODULES IN A DISTRIBUTED PROCESSING SYSTEM

TECHNICAL FIELD

The present invention includes methods, systems, and computer program products for distributing database update messages among processing modules in a distributed processing system. More particularly, the present invention includes methods, systems, and computer program products for multicast compression and pacing of database update messages transmitted between processing modules in a distributed processing system.

BACKGROUND ART

In the communications industry, distributed processing computing platforms are commonly employed in network routing nodes, such as signaling system 7 (SS7) signal transfer points (STPs), Internet protocol (IP) routers, SS7-IP gateways. These distributed processing platforms typically include multiple processing modules or cards. Each processing module may include one or more microprocessors for performing a predetermined processing function. Each processing module may also include one or more databases. In some implementations, groups of processing modules may include copies of a common database, such as a routing database, a local number portability database, a call screening database, a global title translation database, a signaling mediation database, or a mobile services database. In such implementations, processing modules within the group may function as a distributed processing system by sharing the processing load required to process signaling messages. For example, in distributed routing processing, each processing module may be associated with different signaling links and may be responsible for routing signaling messages received on any of its signaling links. By dividing routing processing based on signaling links, message throughput may be increased over implementations where a centralized processor performs routing database lookups for all signaling links.

In distributed database systems, database updates must be communicated to each processing module that maintains a copy of the distributed database. For example, when one processing module detects an event that affects the common database, that processing module preferably updates its copy of the database and communicates the event to other processing modules so that the other processing modules can update their copies of the database.

Two mechanisms by which processing modules can communicate events to other processing modules are unicast messages and multicast messages. Communicating events to other processing modules using unicast messages requires that the sending processor create separate unicast messages to be delivered to each recipient processor. Delivering event messages to multiple processing modules using unicast messages can increase the processing load on the sending processor, because the sending processor is required to formulate individual messages for each destination processor. The processing load on the sending processor can be great, especially when the system includes large numbers of processing modules affected by a database update.

In order to reduce the processing load on the sending processor, a multicast event message distribution mechanism can be used. In one conventional multicast event distribution mechanism, a sending processor formulates a multicast message and includes a multicast distribution list in the message. The sending processor sends the message to the first processor in the multicast distribution list. The first processor in the multicast distribution list processes the message and sends a copy to the second processor in the multicast distribution list. The process is repeated until all of the processors in the multicast distribution list have received the message. Because multicasting distributes the processing required to deliver event information to multiple processors, such a solution is more scalable than a pure unicast method. However, this conventional multicast method has only been used to distribute one event message per multicast message.

In order to further reduce bandwidth utilization on a bus or network that interconnects processing modules in a distributed processing system, it may be desirable to combine multiple multicast messages within a single multicast message. However, combining multiple multicast messages within a single multicast message requires buffering of multicast messages relating to different events, because events occur at different times. While the multicast messages are being buffered, an event affecting a single processing module and therefore requiring unicast delivery may occur. If multicast messages relating to prior events are being buffered, the unicast message may be distributed to its destination before the multicast messages. Delivering messages out of order can result in improper database updates and other errors.

Another problem with distributing event messages is that the processor cycles required to process the event messages may exceed the available processing capacity of a recipient processing module. This is especially true when the sending processing module is a high speed module and the receiving processing module is a legacy or low speed module. Sending database update messages requiring work by a processing module that exceeds the processing capacity of the module can result in a loss of synchronization between databases in a distributed processing system.

Accordingly, in light of these difficulties, there exists a need for methods, systems, and computer program products for multicast compression and pacing of database update messages transmitted between processing modules in a distributed processing system.

DISCLOSURE OF THE INVENTION

The present invention relates to systems and methods for providing efficient inter-processor communication in a distributed, multi-processor computing environment. According to one aspect of the present invention, two or more messages that are to be distributed to processors in a multi-processor system may be combined or compressed into a single multicast message using a packed broadcast message format (PBMF). The single multicast message may include one or more multicast messages and/or one or more unicast messages relating to different events affecting or requiring use of a common database maintained by each processor in the distributed processing system. The single multicast message may be sent by the originating card to the first card in a list of multicast destinations. The first recipient may receive the multicast message, unpack the multicast and unicast messages contained therein, and process messages intended for that destination. The first recipient may also copy and forward the packed multicast message to the next card in the list.

Packing multiple messages in a single message reduces the processing performed by each processor in the system, because each processor is not required to make forwarding decisions for individual messages packed within a multicast message. However, as discussed above, in a distributed system, the order of receiving events is important to ensure that actions/reactions are based on the correct information. Normally, these events are for one processor only and are sent via the unicast mechanism. With the compression of one or more multicasts into a single message, without an ordering mechanism, the order in which unicasts and multicasts are received will be changed. For example, in order to pack multicast messages into a single message, it is necessary to buffer multicast messages when they are received until multiple multicast messages are in the buffer and can be packed in the single message. If an event causes a unicast message to be generated before the multicast messages are sent, the messages may be sent out of order. Sending out of order messages is undesirable in a signaling message routing node because events are interrelated and preserving the time order of the events is important to ensure proper operation.

To ensure that the event is processed correctly, unicasts may also be combined in the PBMF with multicasts. This will ensure that the receiving processor will perform all actions/commands correctly. To ensure that other processors do not process the unicast data, the unicast data will be labeled so that it can be differentiated from multicasts and will specify the card by which the unicast is intended to be processed. Sending unicast messages to processors other than the intended recipient means that a processor may receive messages that are not destined for it, but the gain in compression outweighs the processing time in dealing with discerning which messages are truly for that processor.

In this manner, the number of individual broadcast or multicast messages that must be transmitted, received, and processed by modules in the system is reduced. Although this will have the effect of increasing the size of the multicast message, the improvement in overall system performance resulting from the reduced number of multicast messages substantially outweighs the negative performance impact of a larger message size.

As discussed above, another problem associated with distributing database updates is pacing. For example, if a processing module generates database updates for a destination processing module that is busy, database update errors can occur due to the destination processor being overwhelmed. This is especially true when the processing modules operate at different speeds. In order to avoid this difficulty, the present invention includes a method for pacing database update messages. According to one exemplary pacing method, a centralized granter may determine the minimum processing rate of all of the communications processors in the system. The centralized granter may issue processing grants at a rate so that the minimum rate is not exceeded. For example, when a processing module that has database updates to send may send a message to the granter requesting a work unit for the group of processing modules in the system. If the granter determines that the group has a processing grant available for the time interval when the request was received, the granter will send a grant message to the requestor. The requesting processing module sends the database update message in response to receiving the grant. By ensuring that the processing capacity of the slowest processor in the system is not exceeded, the pacing method increases the likelihood that database updates will be processed correctly by all processors in the system.

The methods and systems described herein for multicast packing and pacing are described herein with regard to distributing database updates for a distributed routing database. However, the present invention is not limited to using multicast packing and pacing for distributing routing database updates. The methods and systems described herein may be used to distribute database updates for any distributed database. In the telecommunications signaling environment, examples of databases that may be updated using the methods and systems described herein include number portability translation databases; global title translation databases; flexible number routing databases; call screening databases; mobile services databases, such as SMS databases, MMS databases, HLR databases, EIR databases, and AuC databases; presence service databases; and signaling message screening databases, such as signaling mediation databases and access control databases.

Exemplary methods and systems for multicast packing and pacing are described herein as tasks, functions, and processes. It is understood that these tasks, functions, and processes may be implemented in hardware, software, firmware, or any combination thereof. For example, these tasks, functions, and processes may comprise computer executable instructions embodied in a computer readable medium for performing the multicast packing and pacing steps described herein.

Accordingly, it is an object of the invention to provide improved methods and systems for packing multiple multicast and unicast messages in a single message to be sent to processors in a distributed processing system.

It is another object of the invention to provide a method for ensuring proper ordering of database updates in a distributed processing system.

It is yet another object of the invention to provide a method for pacing database updates in a distributed processing system.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
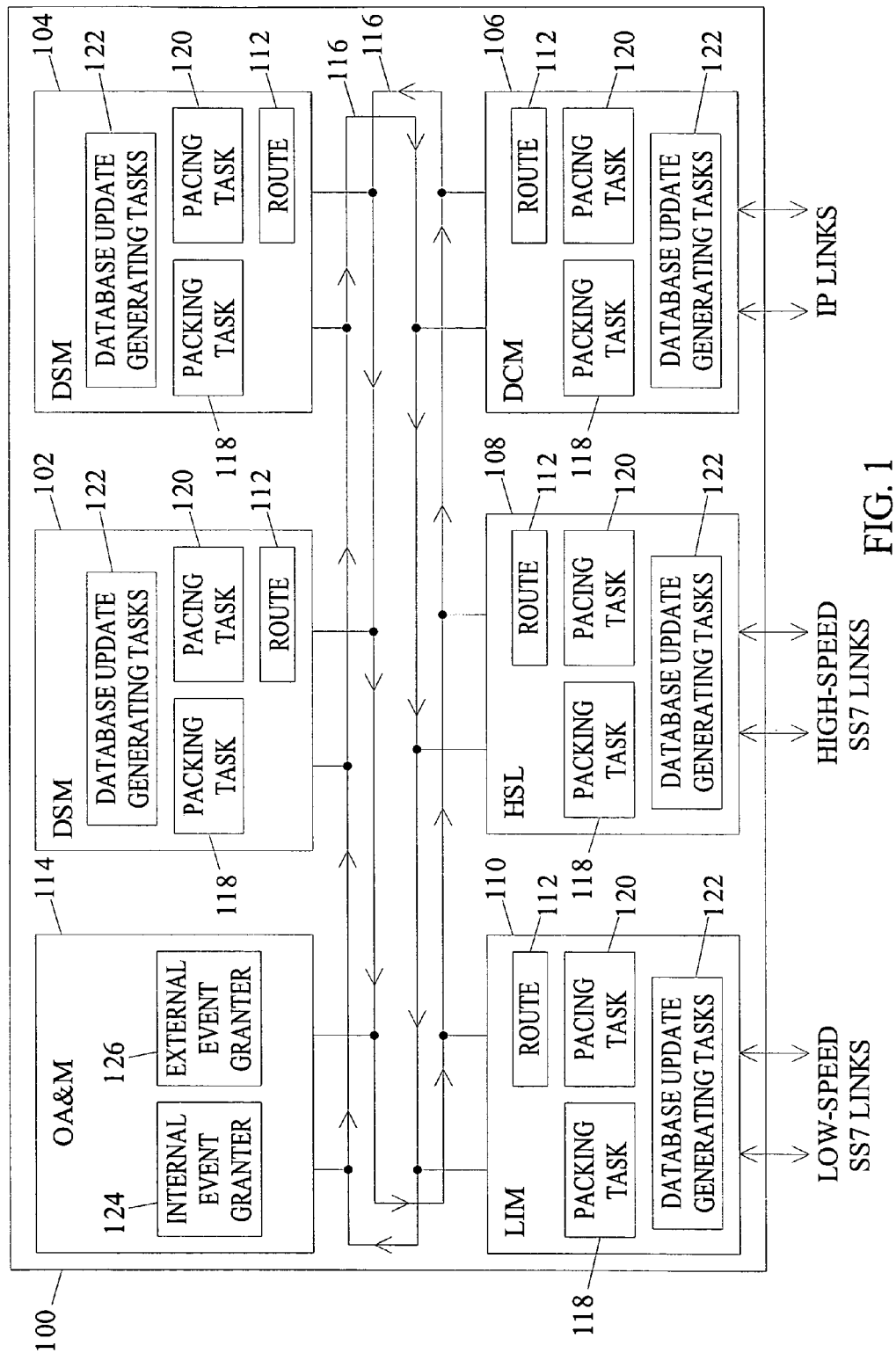
FIG. 1 is a block diagram of a distributed processing system including multicast packing and pacing functionality according to an embodiment of the present invention.

As described above, the present invention includes methods, systems, and computer program products for multicast packing and pacing that are suitable for distributing multicast and unicast messages among processing modules in a distributed processing system where a common database is maintained by each processing module. FIG. 1 illustrates an example of a distributed processing system including multicast packing and pacing functionality according to an embodiment of the present invention. Referring to FIG. 1, a distributed processing system 100 may be a signaling message routing node, such as a signal transfer point, an SS7/IP gateway, an IP router, or any combination thereof. In FIG. 1, routing node 100 includes a plurality of internal processing modules 102, 104, 106, 108, and 110, each of which maintain a copy 112 of a common database. In the illustrated example, processing modules 102 and 104 are database services modules for providing database-related services for telecommunications signaling messages. Examples of database-related services that may be provided by database services modules 102 and 104 include global title translation and number portability translation. Module 106 is a data communications module that provides an interface for sending and receiving SS7 signaling messages and IP telephony signaling messages over IP signaling links. Module 108 is a high speed link interface module that is configured to send and receive SS7 messages over high speed SS7 signaling links. Module 110 is a low speed link interface module configured to send and receive SS7 messages over low speed SS7 signaling links. Database 112 maintained by each processing module is a routing database containing SS7 and/or IP routing tables.

In FIG. 1, routing node 100 also includes an operations, administration, and maintenance (OA&M) module 114 for performing initial database provisioning and for controlling message flow between processing modules. Processing modules 102, 104, 106, 108, 110, and 114 are connected to each other via a counter-rotating, dual-ring bus 116, referred to as the interprocessor message transport (IMT) bus. Each processing module may include a communications processor and an application processor. The communications processor may control communications via bus 116. The application processor on each processing module may perform application-specific functions, such as database lookups and message routing.

In order to decrease the processing required by processing modules 102, 104, 106, 108, and 110 for sending and receiving event-related messages, each processing module may include a packing task 118. Packing task 118 may pack messages relating to different events into a single message and multicast the message to each of the processing modules. In order to ensure that a processing module is not overwhelmed by a packed message, each processing module includes a pacing task 120 for delaying transmission of a packed message when sending the packed message would exceed the processing capacity of any of the recipient processing modules. Each processing module also includes database update generating tasks 122 for generating database update messages relating to events internal to each processing module.

A centralized location, such as OA&M module 114, may maintain the available processing capacity of each of the processing modules. In FIG. 1, OA&M module 114 includes an internal event grantor 124 and an external event grantor 126 for maintaining the processing capacity of each processing module with regard to internal and external events. As used herein, an internal event refers to an event internal to a processing module, such as failure of a subsystem on a processing module. An external event refers to an event that originates outside of distributed processing system 100, such as a link failure. The operation of these modules will be described in more detail below.

Figure 2:
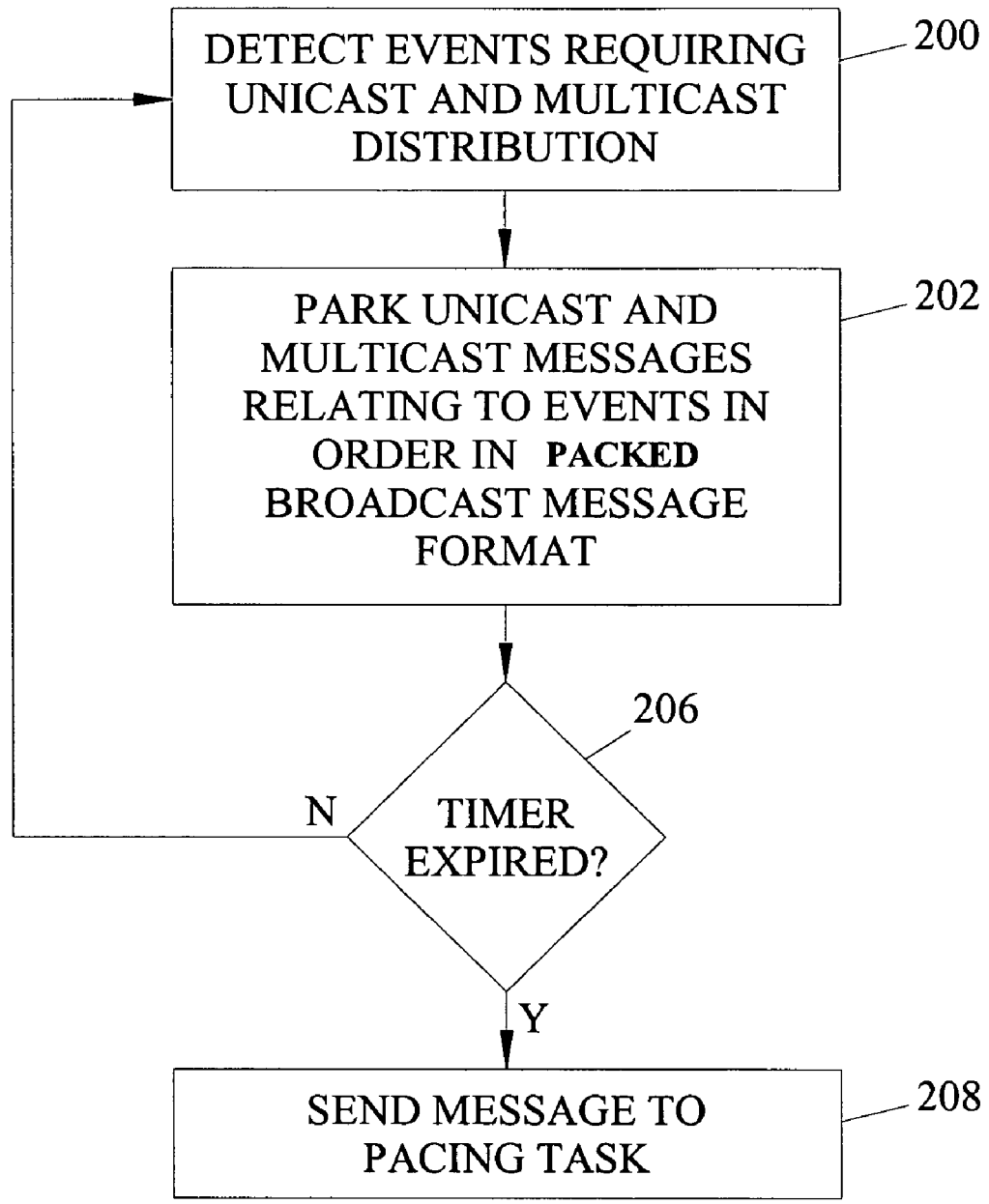
FIG. 2 is a flow chart illustrating exemplary steps that may be performed in packing multiple unicast and multicast messages in a single message and distributing the message to processing modules according to an embodiment of the present invention.

As described with regard to FIG. 1, each processing module includes a packing task 118 that controls the packing of messages to be distributed to processing modules in a distributed processing system. FIG. 2 is a flow chart illustrating exemplary steps that may be performed by packing task 118 of each processing module in packing multiple messages into a single message to be distributed to the processing modules illustrated in FIG. 1. Referring to FIG. 2, in step 200, packing task 118 detects events requiring unicast and multicast distribution. Examples of such events may include network management events relating to the status of a signaling link or signaling route, subsystem management events relating to the status of a subsystem, any other event that affects database 112, or an event that requires an operation to be performed based on the contents of database 112. For example, one event may affect a route in database 112 and another event may require a message, such as a changeover message, to be sent to a node associated with the route. Since it is desirable that the route status be updated before sending a message over the route, packing tasks 118 preferably preserve order of the events. Accordingly, in step 202, packing task 118 packs unicast and multicast messages relating to the events in order in a packed broadcast message format. Packing unicast and multicast messages in order in the packed broadcast message format ensures that events will not be delivered out of order to the recipient processors.

In theory, the greatest bandwidth utilization efficiency would be achieved by packing as many messages as possible in the packed broadcast message format. However, since it may be desirable to communicate network management messages quickly among processing modules in a distributed processing system, each packing task 118 preferably maintains a timer to determine when to distribute a packed message among processing modules in a distributed processing system. The timer may start upon receipt or generation of the first event message to be delivered to one or more processing modules after the last packed message was sent. Packing task 118 packs messages in the packed broadcast message format until the timer expires. When the timer expires, packing task 118 distributes the message among the processing modules. Accordingly, in step 206, packing task 118 determines whether the timer has expired. If the timer has not expired, control returns to steps 200 and 202 where packing task 118 continues to pack unicast and broadcast messages in the packed multicast message format. If the timer expires, control proceeds to step 208 where packing task 118 delivers the packed message to pacing task 120.

Figure 3A:
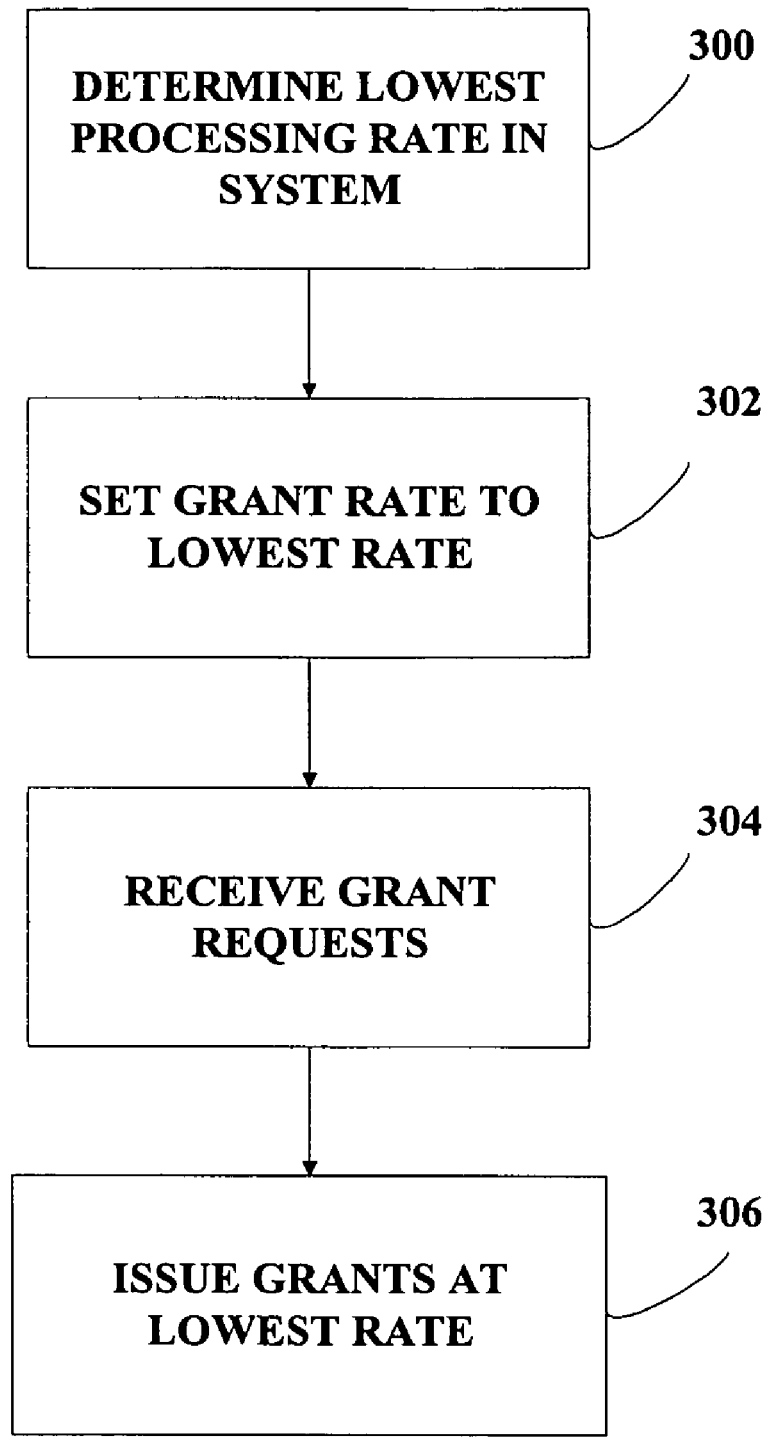
FIG. 3A is a flow chart illustrating exemplary steps that may be performed by a network management granter in issuing grants in response to requests for work regarding database update messages according to an embodiment of the invention.

FIG. 3A is a flow chart illustrating exemplary steps that may be performed by a centralized granting function in pacing messages relating to database update and network management events according to an embodiment of the present invention. Referring to FIG. 3A, in step 300, the centralized granting function determines the slowest communications processor rate in the system. This step may be performed during initialization of each processing module. During the initialization, each processing module may send its processing rate to the centralized granting function. The centralized granting function may compare the received processing rates and determine the lowest rate in the system. In step 302, the centralized granting function sets the grant rate to the lowest rate in the system. Setting the rate to the lowest rate in the system will ensure that the processing capacity of each processing module is not exceeded.

In step 304, the centralized granting function receives grant requests from processing modules desiring to send database update messages. In step 306, the centralized granting function issues grant requests at the lowest rate. For example, if the slowest rate in the system is one grant per five milliseconds, grants are preferably issued at a rate that does not exceed one grant per five milliseconds. Once the centralized granting function issues a grant to one processing module, the centralized granting function decrements the number of available grants for the associated time interval. If all grants have been issued for a particular time interval, a grant request for another processing module may not be granted until the next time interval in which grants are available. By keeping track of the lowest processing capacity and the corresponding grant requests, the centralized granting function ensures that processors will not be overwhelmed and database updates will be correctly processed.

Figure 3B:
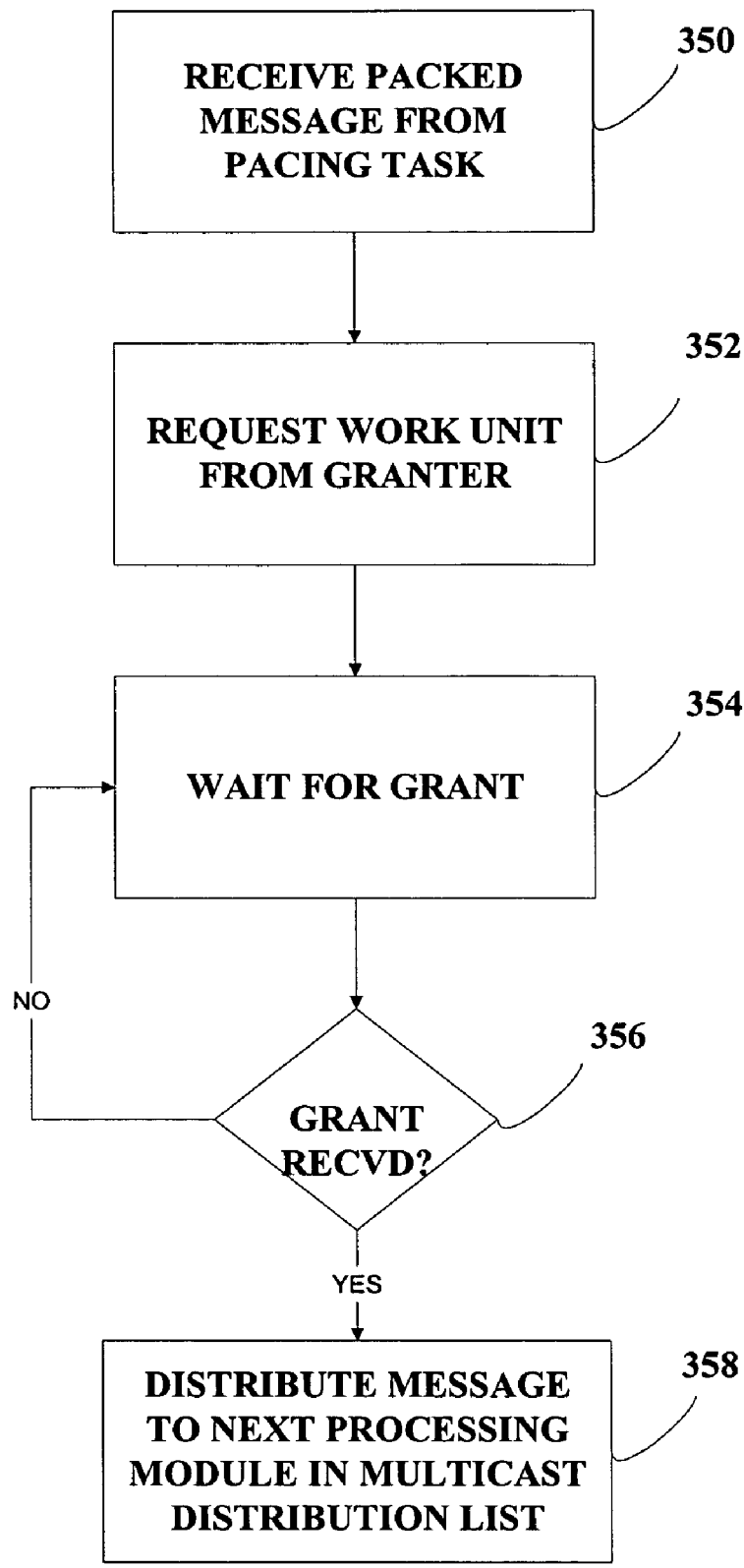
FIG. 3B is a flow chart illustrating exemplary steps that may be performed by a pacing task in requesting a grant and sending a message in response to the grant according to an embodiment of the present invention.

FIG. 3B is a flow chart illustrating exemplary steps that may be performed by pacing task 120 in response to receiving a packed message requiring distribution to other processing modules. Referring to FIG. 3B, in step 350, pacing task 120 receives a packed message from packing task 118. In step 352, pacing task 118 requests a work unit from the granter. In steps 354 and 356, pacing task 118 waits for a grant message from the centralized granter. Once the grant message is received, in step 358, pacing task 118 distributes the message to the next processing module in the multicast distribution list.

Figure 4:
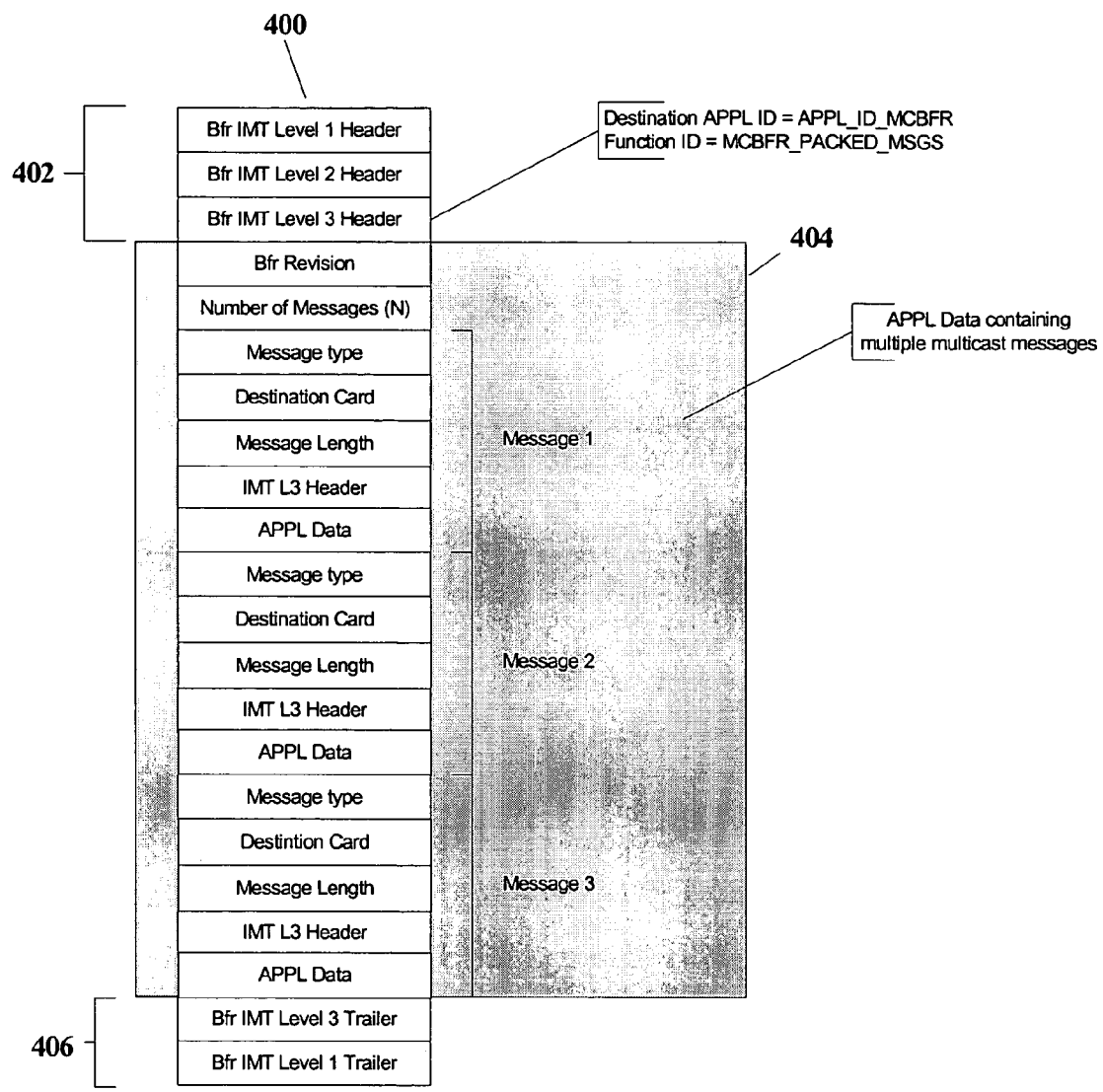
FIG. 4 is a block diagram illustrating an exemplary packed broadcast message format for simultaneously distributing multiple messages among processing modules in a distributed processing system according to an embodiment of the present invention.

As described with respect to FIG. 2, packing task 118 associated with each processing module preferably packs multiple multicast and unicast messages into a packed broadcast message format. FIG. 4 is a block diagram illustrating an exemplary packed broadcast message format suitable for use with embodiments of the present invention. Referring to FIG. 4, the packed broadcast message format includes IMT header portion 402, an application data portion 404, and an IMT trailer portion 406. IMT header portion 402 stores information used by the receiving communication and application processors for identifying multicast messages. For example, the IMT level 1 header stores the destination card address used by the communications processor to identify the destination of a packed message. The IMT level 2 header stores the originating card address. The IMT level 3 header stores origination subsystem, origination application, multicast message identifier, destination subsystem, destination application, and function. Application data portion 404 stores individual packed multicast and/or unicast messages. IMT trailer portion 406 stores a multicast list indicating the list of cards that are intended to receive each packed message and a pointer to the next card in the list. For example, the IMT level 3 trailer stores the multicast address list, a multicast address list index, and the multicast address list length. The IMT level 1 trailer stores a flag indicating the end of the message.

Using the packed broadcast message format illustrated in FIG. 4, the processing load on individual communications processors associated with the processing modules is reduced. For example, each communications processor only has to make a single forwarding decision, i.e., whether or not to forward the packed message to subsequent processing modules. In contrast, in conventional database update distribution systems, the communications processor was required to make a forwarding decision for each individual message received from another processing module.

Figure 5A:
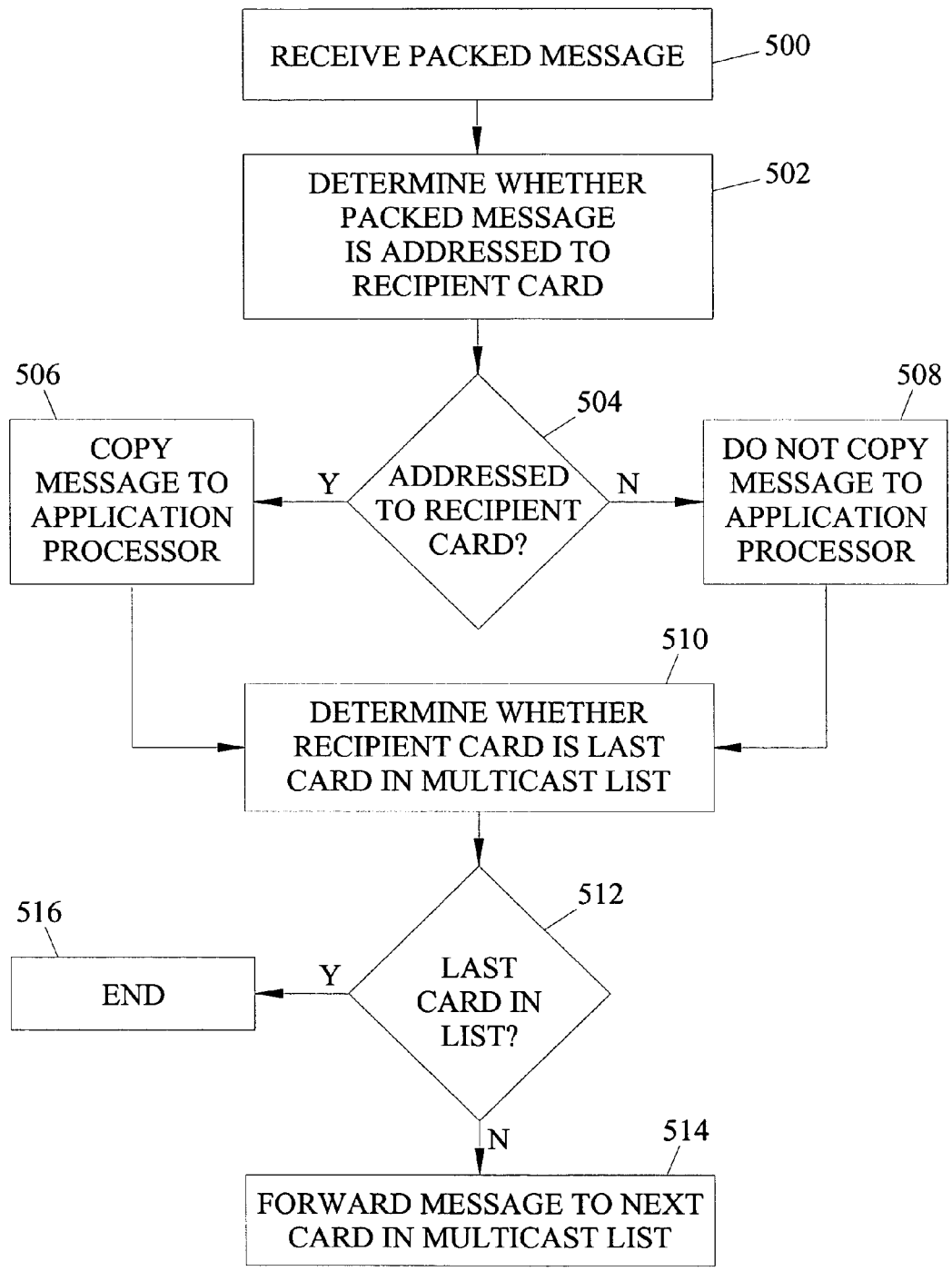
FIG. 5A is a flow chart illustrating exemplary steps that may be performed by a communications processor of each processing module illustrated in FIG. 1 in processing a packed message.

FIG. 5A illustrates exemplary steps that may be performed by a communications processor in processing a packed message according to an embodiment of the present invention. Referring to FIG. 5A, in step 500, the communications processor on a recipient card receives a packed message. In steps 502 and 504, the communications processor determines whether the packed message is addressed to the recipient card. These steps may be accomplished by analyzing the IMT level 1 header to determine whether the message is a multicast message. If the IMT level 1 header indicates that the message is a multicast message, the IMT level 1 trailer is analyzed to determine whether the recipient card address is in the multicast address list. If the recipient card address is in the list, control proceeds to step 506 where the message is copied to the application processor. If the recipient card address is not in the multicast list, control proceeds to step 508 where the message is not copied to the application processor. In steps 510 and 512, it is determined whether the recipient card is the last card in the multicast list. If the recipient card is not the last card, control proceeds to step 514 where the message is forwarded to the next card in the multicast list. If the recipient card is the last card in the list, control proceeds to step 516 where processing of the received packed message ends.

Thus, using the steps illustrated in FIG. 5A, the processing load on the communications processor is reduced because the communications processor can make a single forwarding decision for multiple messages. This is especially advantageous in situations where the communications processor on a processing module has reduced processing power and/or capacity, when compared with the application processor on a particular processing module.

Figure 5B:
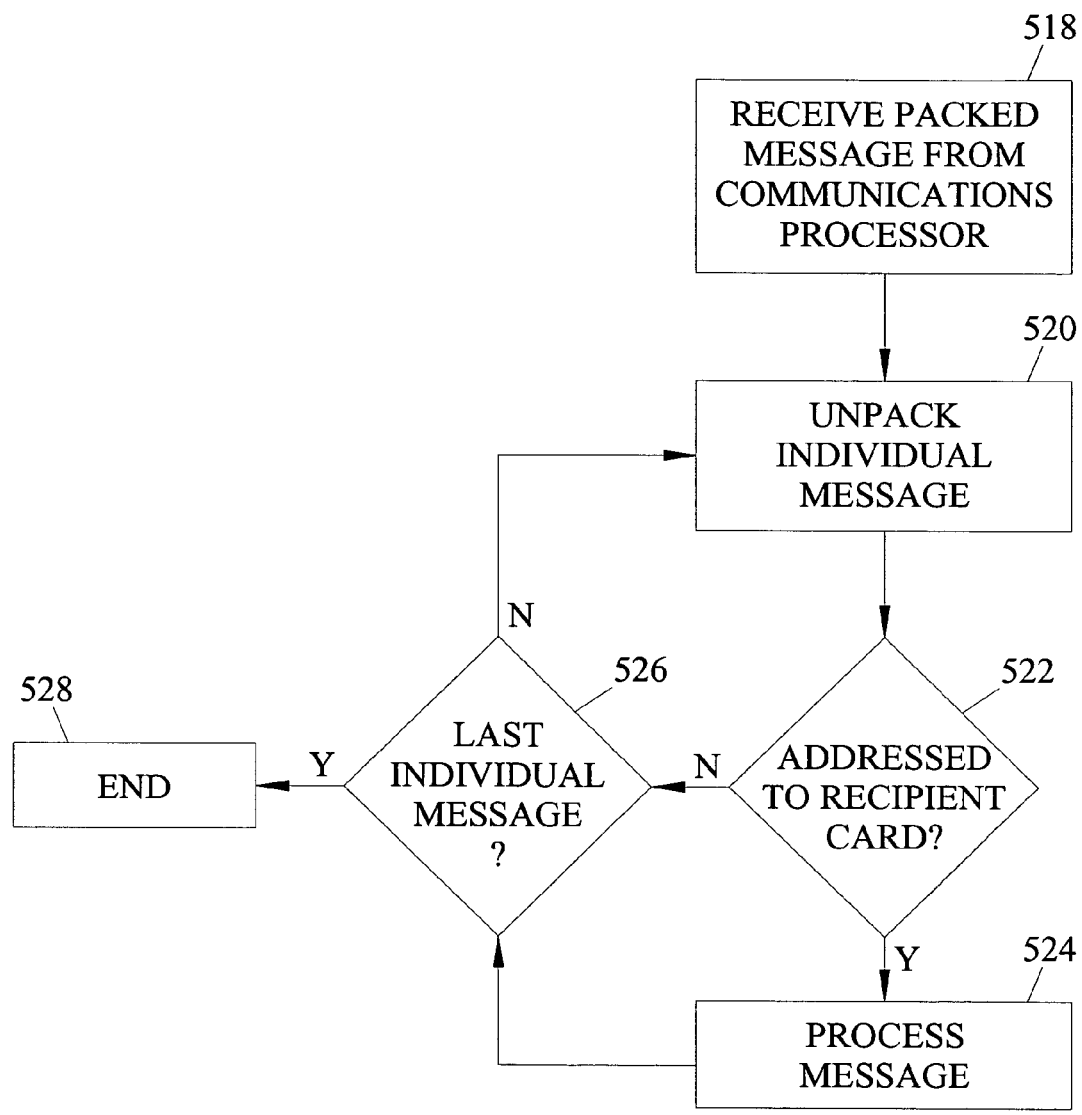
FIG. 5B is a flow chart illustrating exemplary steps that may be performed by an application processor of each processing module illustrated in FIG. 1 in processing a packed message.

FIG. 5B illustrates exemplary steps performed by an application processor on a processing module in response to receiving a packed message from a communications processor. Referring to FIG. 5B, in step 518, the application processor receives a packed message from a communications processor. In step 520, the application processor unpacks the first individual message from the packed message. In step 522, it is determined whether the first individual message is addressed to the recipient card. This step may be performed by analyzing the destination card field in the message. If the message is addressed to the recipient card, control proceeds to step 524 where the message is processed. If the message is not addressed to the recipient card, the message is ignored by the application processor. After step 522 or 524, control proceeds to step 526 where it is determined whether the first message is the last individual message in the packed message. If the first message is not the last individual message, steps 520, 522, and 524 are repeated for the next message. If the message is the last individual message, control proceeds to step 528 where processing of the packed message ends.

Thus, using the steps illustrated in FIG. 5B, an application processor unpacks individual messages in order from the packed message. Because the messages are packed and unpacked in order, the correct ordering of events is ensured. In addition, because the application processor simply ignores messages that are not addressed to it, unnecessary processing is minimized.

Figure 6:
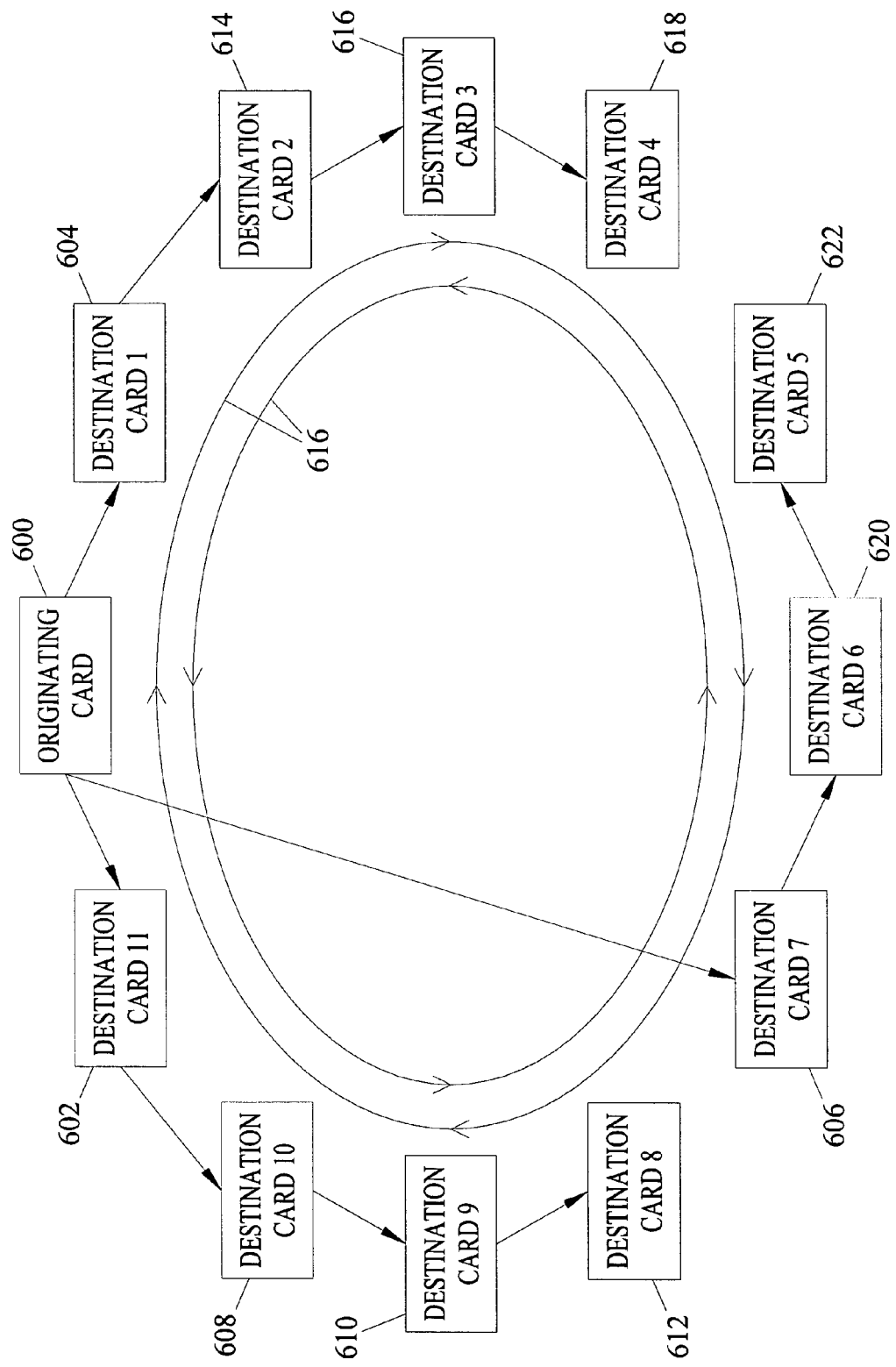
FIG. 6 is a block diagram illustrating a conventional multicast distribution scheme that may be used to distribute packed messages among processing modules.

FIG. 6 is a block diagram illustrating a conventional multicast method that may be used by the processing modules illustrated in FIG. 1 in distributing packed messages. Referring to FIG. 6, originating card 600 originates three messages intended for multicast distribution. The first message is sent to card 602. The second message is sent to card 604, and the third message is sent to card 606. The message sent to card 602 contains a multicast distribution list including cards 602, 608, 610, and 612. The multicast message sent to destination card 606 contains a multicast distribution list including cards 606, 620, and 622. The multicast message sent to card 604 includes a multicast distribution list having cards 604, 614, 616, and 618. Each card receives the multicast message, determines whether the card's address is in the multicast list, processes the message if the card's address is in the list, and forwards the message to the next card in the list. One reason that originating card 600 is required to formulate three messages to effect multicast distribution is due to a limitation on the number of messages that can be included in a multicast distribution list. In one exemplary implementation, the maximum size of the multicast distribution list may be thirty-two destinations. However, the present invention is not limited to a maximum multicast address list size of thirty-two destinations. The number of destinations can be increased by increasing the field size of the multicast distribution list field in the trailer portion of the packed broadcast message format.

Because the packed message distributed among the processing modules illustrated in FIG. 6 carries multiple multicast and/or unicast messages, the multicast distribution scheme illustrated in FIG. 6 is more efficiently utilized. That is, the number of forwarding decisions made by each destination card is reduced by the number of messages included within each packed message. In addition, bandwidth on buses 616 is reduced because multiple individual messages can be sent using a single level 1 IMT header and trailer.

Figure 7:
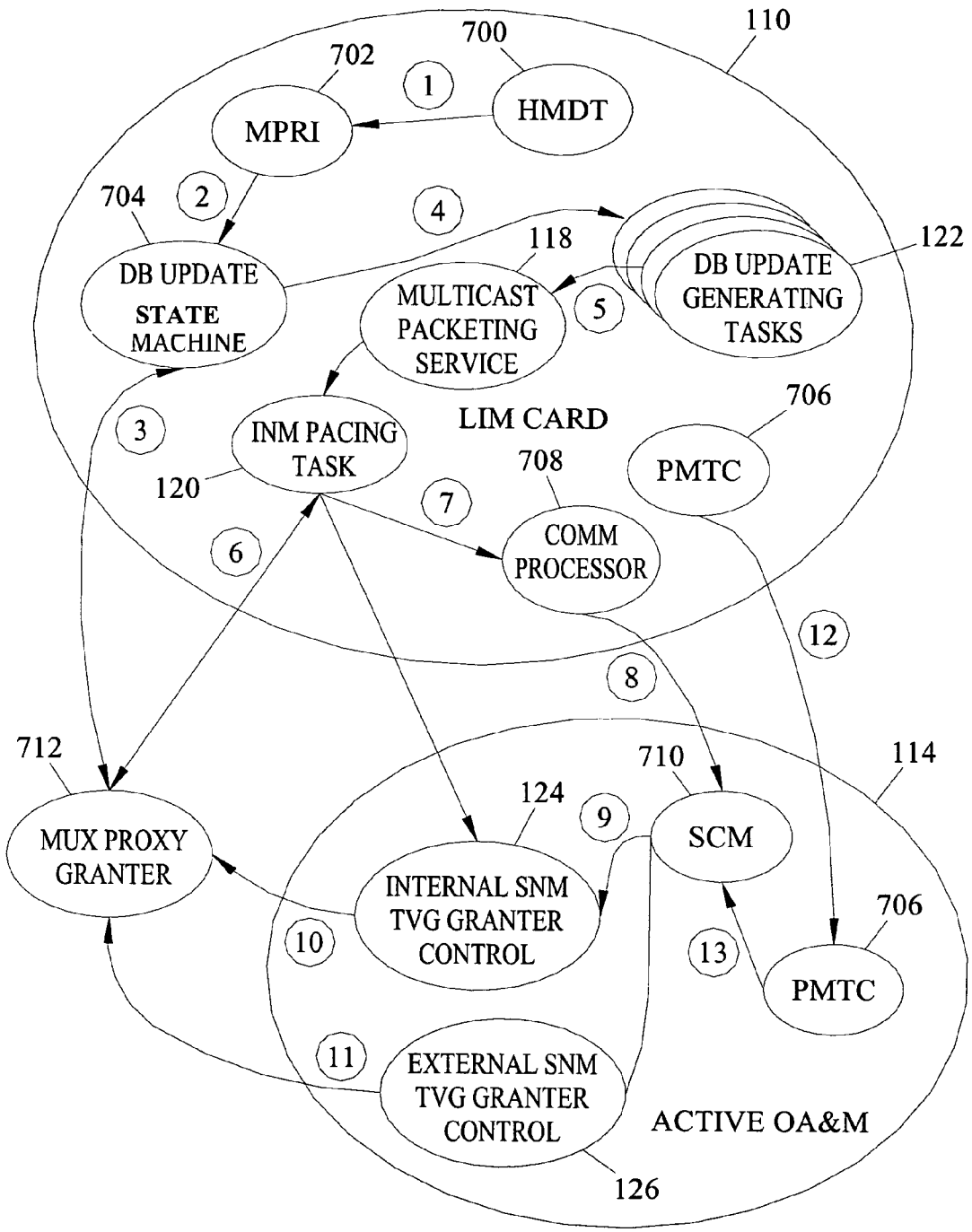
FIG. 7 is a block diagram illustrating exemplary events and processes associated with multicast packing and pacing according to an embodiment of the present invention.

As discussed above, in one exemplary implementation, the pacing of packed messages is centralized. FIG. 7 is a block diagram illustrating detailed steps and associated functions for centralized pacing of packed messages according to an embodiment of the present invention. Referring to FIG. 7, link interface module 110 communicates with OA&M module 114 to determine whether recipient processing modules have sufficient processing capacity to process a packed message. In FIG. 7, the link interface module 110 includes packing task 118, pacing task 120, and database update generating tasks 122, as described above with regard to FIG. 1. In addition, link interface module includes a message handling and distribution (HMDT) function 700, a message prioritization (MPRI) function 702, a database update state machine 704, a peripheral maintenance (PMTC) function 706, and a communications processor 708. HMDT function 700 distributes messages among processing modules that are intended for internal processing by a signaling message routing node, such as signaling message routing node 100 illustrated in FIG. 1. MPRI function 702 orders database updates according to priority. Database update state machine 704 maintains state information regarding whether a packed message can be sent to other processing modules in the system. PMTC function 706 maintains the status of the application processor (not shown) associated with LIM 110. Communications processor 708 controls communications with other processing modules over bus 116.

OA&M module 114 includes internal and external signaling network management grant control functions 124 and 126 described above with regard to FIG. 1. In addition, OA&M module 114 includes a system configuration (SCM) function to program the rate of centralized granting function 712. Centralized granting function 712 may accept requests to transmit database updates within the system based on processing capacity of the communications processor of each processing module. OA&M module 114 also includes a PMTC function 706 for maintaining the status of its application processor.

The following list contains an order of events associated with database updates using the processing modules in FIG. 7. The numbers in the list refer to the numbers within the circles in FIG. 7. The example in the list includes both an internal network management (INM) event and a signaling network management (SNM), both of which may be paced using the pacing methods described herein.

1. HMDT function 700 receives a network management message regarding a signaling or external network management event from message transfer part (MTP) level 2. HMDT function 700 then forwards this message to MPRI function 702 for prioritization.
2. MPRI function 702 orders the external network management event via priority, places the message in a queue according to the priority, and requests work from the current database update state machine 704.
3. Database update state machine 704 requests capacity from proxy granter 712 for the group of processing modules affected by the event and eventually receives a grant.
4. Database update state machine 704 dequeues one message from a queue associated with MPRI function 704 and sends it to the appropriate task where the message is processed internally by LIM 10.
5. Database update generating task 122 generates internal network management messages, which are sent to multicast packing task 118. Multicast packing task 118 packs the network management messages into a single packed message. When the message containing multiple updates is either full or has not been sent for a predetermined time, it is sent to multicast pacing task 120.
6. Multicast pacing task 120 requests capacity from OA&M 114 for the group of processing modules affected by the internal network management messages. On receiving a grant from the INM group, multicast pacing task 120 performs an ex-post-facto request from the SNM group. An ex-post-facto request will enforce that a non-utilized unit of work will be taken from the SNM granter, ensuring that the total amount of work between INM and SNM remains constant.
7. NM pacing task 120 then sends the message off card to the appropriate task/card via communications processor 708.

The following steps may be performed during card initialization:
8. Communications processor 708 sends the initial maintenance block to OA&M 114 informing it of it's software version and it's presence on the IMT.
9. SCM 710 informs the INM and SNM state machines 124 and 126 to examine all IMT GPLs running, determines the minimum multicast rate of the system.
10. INM state machine 124 sends a make_granter message to proxy granter 712 with the determined system multicast rate.
11. SNM state machine 126 sends a make_granter message to proxy granter 712 with the determined system multicast rate.

The following steps may be performed when a card fails or is removed from the system:
12. When a card fails, PMTC 706 will inform other cards, including OA&M 114, within the system that this card is no-longer present.
13. PMTC 706 on OA&M 114 informs SCM 710 if a card is removed from the IMT bus.

Thus, using the steps described above, multicast and unicast messages can be packed in a single packed message format and distributed among processing modules in a distributed processing system.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for efficiently distributing messages regarding events that affect or require use of a database in a distributed processing system where copies of the database are maintained by multiple processors, the method comprising:

at a source node:
(a) receiving a first message relating to a first telecommunications signaling event that affects a database maintained by each of a plurality of processing modules in a distributed processing system;
(b) receiving a second message relating to a second telecommunications signaling event;
(c) packing the first and second messages in a third message, wherein packing the first and second messages in a third message includes packing the first and second messages in the third message in a manner that communicates time ordering of the first and second events to the processing modules, wherein the first message is a multicast message for processing by at least two of the processing modules, wherein the second message is a unicast message for processing by a single processing module, and wherein the time ordering indicates a processing order of the messages at the processing modules as intended by the source node; and
(d) multicasting the third message to the processing modules.

2. The method of claim 1 wherein the database comprises a routing database, the first event affects a route in the database, and the second event requires a message to be routed over the affected route.

3. The method of claim 1 wherein the database comprises a mobile services database.

4. The method of claim 1 wherein the database comprises a number portability database.

5. The method of claim 1 wherein the database comprises a global title translation database.

6. The method of claim 1 wherein the database comprises a signaling message screening database.

7. The method of claim 1 comprising maintaining a timer in response to receipt of the first message and wherein multicasting the third message includes multicasting the third message when the timer expires.

8. The method of claim 1 wherein multicasting the third message to the processing modules, includes, at each processing module, sending the third message to the next processing module in a multicast list contained in the third message.

9. The method of claim 1 multicasting the third message to the processing modules includes multicasting the third message in response to receiving a grant message indicating that each of the processing modules has an available work unit.

10. A system for efficiently distributing messages that affect or require use of a database in a distributed processing system where copies of the database are maintained by multiple processors, the system comprising:

a source node including:
(a) a database update generating task for generating database update messages for telecommunications signaling events that affect or use a database maintained by each of a plurality of processing modules in a distributed processing system; and
(b) a packing task operatively associated with the database update generating task for receiving the messages, for packing the messages into a single message, wherein the packing task is adapted to place the messages in the packed message in a manner that preserves time ordering of the events, wherein the packed message includes a first message that is a multicast message for processing by at least two of the processing modules and a second message that is a unicast message for processing by a single processing module, and wherein the time ordering indicates a processing order of the messages at the processing modules as intended by the source node, and for forwarding the messages for distribution among the processing modules in the distributed processing system.

11. The system of claim 10 wherein the database update generating task is adapted to produce database update messages relating to network management events.

12. The system of claim 10 wherein the packing task is adapted to maintain a timer associated with each database update message and to forward the packed message for distribution in response to expiration of one of the timers.

13. The system of claim 10 comprising a pacing task for receiving the packed message from the packing task, for requesting a grant to send the packed message, and for sending the packed message to the processing modules in response to receiving the grant.

14. The system of claim 13 wherein the pacing task is adapted to multicast the packed message among the processing modules, wherein the packed message includes at least one multicast message and at least one unicast message.

15. A processing module for processing packed messages containing a plurality of individual messages affecting or using a database maintained by a plurality of processing modules in a distributed processing system, the processing module comprising:

(a) a communications processor for receiving a packed message containing individual messages relating to telecommunications signaling events that affect or require use of a database maintained by a plurality of processors in a distributed processing system, wherein the packed message includes a first message that is a multicast message for processing by at least two of the processing modules and a second message that is a unicast message for processing by a single processing module, the communications processor for examining information in the packed message to determine whether the packed message is addressed to it, and in response to determining that the packed message is addressed to the communications processor, for copying the packed message; and
(b) an application processor for receiving the packed message copied by the communications processor, for unpacking the individual messages within the packed message, and for processing individual messages that are addressed to the application processor, wherein the individual messages are packed in the packed message by a source node in a manner that indicates a processing order of the individual messages as intended by the source node, and wherein the application processor processes the packed messages in the order intended by the source node.

16. The processing module of claim 15 wherein the communications processor is adapted to forward the packed message to a next communications module in a multicast distribution list in the packed message.

17. The processing module of claim 15 wherein the application processor is adapted to ignore individual messages that are not addressed to the application processor.

18. A computer program product comprising computer-executable instructions embodied in a computer-readable medium for performing steps comprising:

at a source node:
 (a) receiving a first message relating to a first telecommunications signaling event that affects a database maintained by each of a plurality of processing modules in a distributed processing system;
 (b) receiving a second message relating to a telecommunications signaling second event;
 (c) packing the first and second messages in a third message, wherein packing the first and second messages in a third message includes packing the first and second messages in the third message in a manner that communicates time ordering of the first and second events to the processing modules, wherein the first message is a multicast message for processing by at least two of the processing modules, wherein the second message is a unicast message for processing by a single processing module, and wherein the time ordering indicates a processing order of the messages at the processing modules as intended by the source node; and
 (d) multicasting the third message to the processing modules.

19. The computer program product of claim 18 wherein the database comprises a routing database, the first event affects a route in the database, and the second event requires a message to be routed over the affected route.

20. The computer program product of claim 18 comprising maintaining a timer in response to receipt of the first message and wherein multicasting the third message includes multicasting the third message when the timer expires.

21. The computer program product of claim 18 wherein multicasting the third message to the processing modules, includes, at each processing module, sending the third message to the next processing module in a multicast list contained in the third message.

22. The computer program product of claim 18 wherein multicasting a third message to the processing modules includes multicasting the third message in response to receiving a grant message indicating that each of the processing modules has an available work unit.

\* \* \* \* \*